United States Patent
Kim

(10) Patent No.: US 12,503,007 B2
(45) Date of Patent: Dec. 23, 2025

(54) DEVICE AND METHOD FOR CONTROLLING STATE OF CHARGE OF BATTERY OF HYBRID VEHICLE

(71) Applicants: Hyundai Motor Company, Seoul (KR); Kia Corporation, Seoul (KR)

(72) Inventor: Kyoung Joo Kim, Daejeon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 1151 days.

(21) Appl. No.: 17/391,652

(22) Filed: Aug. 2, 2021

(65) Prior Publication Data
US 2022/0266716 A1 Aug. 25, 2022

(30) Foreign Application Priority Data
Feb. 25, 2021 (KR) .................. 10-2021-0025999

(51) Int. Cl.
 *B60L 58/13* (2019.01)
 *B60L 50/61* (2019.01)
 *B60W 20/13* (2016.01)

(52) U.S. Cl.
 CPC .............. *B60L 58/13* (2019.02); *B60L 50/61* (2019.02); *B60W 20/13* (2016.01); *B60L 2260/52* (2013.01); *B60L 2260/58* (2013.01); *B60W 2510/244* (2013.01); *B60W 2710/244* (2013.01)

(58) Field of Classification Search
 CPC ......... B60L 58/13–15; B60L 50/61–62; B60L 2260/52; B60L 2260/58; B60W 20/13; B60W 2710/244; B60W 2510/244
 See application file for complete search history.

(56) References Cited

U.S. PATENT DOCUMENTS

| | | | |
|---|---|---|---|
| 9,834,199 B2 | 12/2017 | Yoon | |
| 10,836,371 B1* | 11/2020 | Thiruvengadam | B60W 50/085 |
| 10,989,550 B2 | 4/2021 | Cha et al. | |
| 11,807,213 B2 | 11/2023 | Ferreira De Araujo et al. | |
| 2016/0167641 A1 | 6/2016 | Yoon | |
| 2017/0021714 A1* | 1/2017 | Niimi | B60W 20/20 |

(Continued)

FOREIGN PATENT DOCUMENTS

| | | |
|---|---|---|
| CN | 105691383 A | 6/2016 |
| CN | 111032465 A | 4/2020 |

(Continued)

OTHER PUBLICATIONS

Chinese Office Action for Chinese Patent Application No. 202110928857.X issued Sep. 26, 2025, with English translation, 16 pages.

*Primary Examiner* — David V Henze-Gongola
(74) *Attorney, Agent, or Firm* — Fox Rothschild LLP

(57) ABSTRACT

A device and a method for controlling an SOC of a battery of a hybrid vehicle are provided. The device includes at least one processor, and the processor sets a battery SOC at a time of terminating operation of the vehicle by activating a SOC setting function when a destination is set. The processor further determines whether the set battery SOC is equal to or less than a SOC chargeable with a high efficiency, and performs battery SOC control such that a battery SOC reaches the set battery SOC at a time of arrival at the destination of the vehicle when the set battery SOC is equal to or less than the SOC chargeable with the high efficiency.

16 Claims, 18 Drawing Sheets

(56) References Cited

U.S. PATENT DOCUMENTS

2019/0249638 A1\* 8/2019 Miller .................... B60L 50/61
2019/0390970 A1   12/2019 Cha et al.
2020/0331452 A1   10/2020 Ferreira De Araujo et al.

FOREIGN PATENT DOCUMENTS

JP          2019-213277  A      12/2019
KR    10-2020-0000608  A       1/2020
WO    WO-2013044357  A1 \*    4/2013   .............. B60L 11/02

\* cited by examiner

DEVICE AND METHOD FOR CONTROLLING STATE OF CHARGE OF BATTERY OF HYBRID VEHICLE

CROSS-REFERENCE TO RELATED APPLICATION

This application claims the benefit of priority to Korean Patent Application No. 10-2021-0025999, filed on Feb. 25, 2021, the entire contents of which are incorporated herein by reference.

TECHNICAL FIELD

The present disclosure relates to a device and a method for controlling a state of charge (SOC) of a battery of a hybrid vehicle.

BACKGROUND

Recently, as a camping population increases, there are many cases in which a heavy battery is additionally carried to use electricity during camping or a vehicle engine is operated to produce and use the necessary electricity. However, with recent extensive diffusion of a hybrid vehicle, a large-capacity high-voltage battery is mounted on the hybrid vehicle differently from a general internal combustion engine vehicle, so that the electricity may be supplied by utilizing the large-capacity high-voltage battery during the camping.

However, even though the high-capacity battery is mounted on the hybrid vehicle, electric energy is not able to be used when the high-capacity battery is not charged. In the battery of the hybrid vehicle, a controller determines a charging/discharging amount of the high-voltage battery and manages a SOC of the battery to increase fuel economy of the vehicle. Thus, a situation in which a user is not able to use the electricity of the high-voltage battery after arriving at the campsite even when the user wants to use the electricity of the high-voltage battery occurs.

It is necessary to charge the battery by operating an engine to prevent battery discharge to use the battery while stopping after arriving at a destination. However, when driving the engine in the highest operation line while stopping, the engine and an exhaust pipe may generate a substantial amount of heat and damage the vehicle, so that the engine is not able to be driven for a substantial period of time.

SUMMARY

The present disclosure has been made to solve the above-mentioned problems occurring in the prior art while advantages achieved by the prior art are maintained intact. An aspect of the present disclosure provides a device and a method for controlling a state of charge (SOC) of a battery of a hybrid vehicle that enable a SOC of the battery at a time point at which operation of the vehicle is terminated to be set. In addition, another aspect of the present disclosure provides a device and a method for controlling a SOC of a battery of a hybrid vehicle that control the battery SOC during travel such that the battery SOC reaches a battery SOC desired by a user when arriving at a destination.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a device for controlling a SOC of a battery of a hybrid vehicle may include at least one processor, and the processor is configured to set a battery SOC at a time of terminating operation of the vehicle by activating a SOC setting function when a destination is set, determine whether the set battery SOC is equal to or less than a SOC chargeable with a high efficiency, and perform battery SOC control such that a battery SOC reaches the set battery SOC at a time of arrival at the destination of the vehicle when the set battery SOC is equal to or less than the SOC chargeable with the high efficiency.

In one implementation, the processor may be configured to display a settable SOC range and an SOC range chargeable during travel to the destination on a display screen when the SOC setting function is activated. The processor may be configured to automatically set the battery SOC at the time of terminating the operation by referring to a SOC setting history stored in storage when the SOC setting function is activated. The SOC chargeable with the high efficiency may be a battery SOC expected when operating an engine to the destination in an optimal operating line (OOL).

In addition, the SOC chargeable with the high efficiency may be set to a settable maximum SOC when a travel distance to the destination is equal to or greater than a reference distance. The reference distance may be varied based on information on altitudes of the destination and a current location of the vehicle. The processor may be configured to set a charging profile by utilizing travel route information when the set battery SOC exceeds an SOC balance level, and control an engine operating point based on the set charging profile to charge the battery.

In one implementation, the processor may be configured to prohibit switching of a travel mode to an electric vehicle (EV) mode and operate an engine in an optimal operating line to charge the battery with remaining energy excluding energy required for travel when a travel load is low and when a current battery SOC is less than the set battery SOC. The processor may be configured to set the set battery SOC to a SOC balance level to control the battery SOC to converge to the set battery SOC when a current battery SOC is greater than the set battery SOC.

In addition, the processor may be configured to set the SOC balance level to be less than the set battery SOC to perform the battery SOC control when the set battery SOC is set to be equal to or greater than a predetermined reference SOC, and charge the battery to the set battery SOC when the vehicle approaches the destination. The processor may be configured to set an SOC balance level to be less than the set battery SOC to perform the battery SOC control when the set battery SOC is set to be equal to or greater than a predetermined reference SOC, control the battery SOC to swing based on the SOC balance level when the battery SOC reaches the SOC balance level, and charge the battery to the set battery SOC when the vehicle approaches the destination.

According to another aspect of the present disclosure, a method for controlling an SOC of a battery of a hybrid vehicle may include setting a battery SOC at a time of terminating operation of the vehicle by activating a SOC setting function when a destination is set, determining whether the set battery SOC is equal to or less than an SOC chargeable with a high efficiency, and performing battery SOC control such that a battery SOC reaches the set battery SOC at a time of arrival at the destination of the vehicle when the set battery SOC is equal to or less than the SOC chargeable with the high efficiency.

In one implementation, the setting of the battery SOC may include displaying a SOC range and a SOC range chargeable during travel to the destination on a display screen the SOC setting function is activated. The setting of the battery SOC may further include automatically setting the battery SOC at the time of terminating the operation by retelling to a SOC setting history stored in storage when the SOC setting function is activated. The determining of whether the set battery SOC is equal to or less than the SOC chargeable with the high efficiency may include setting a battery SOC expected when operating an engine to the destination in an optimal operating line (OOL) as the SOC chargeable with the high efficiency.

In one implementation, the determining of whether the set battery SOC is equal to or less than the SOC chargeable with the high efficiency may further include setting the SOC chargeable with the high efficiency to a settable maximum SOC when a travel distance to the destination is equal to or greater than a reference distance. The reference distance may be varied based on information on altitudes of the destination and a current location of the vehicle. In addition, the performing of the battery SOC control may include setting a charging profile by utilizing travel route information when the set battery SOC exceeds an SOC balance level, and controlling an engine operating point based on the set charging profile to charge the battery.

The performing of the battery SOC control may include prohibiting switching of a travel mode to an EV mode and operate an engine in an optimal operating line to charge the battery with remaining energy excluding energy required for travel when a travel load is low and when a current battery SOC is less than the set battery SOC. In one implementation, the performing of the battery SOC control may include setting the set battery SOC to a SOC balance level to control the battery SOC to converge to the set battery SOC when a current battery SOC is greater than the set battery SOC.

Additionally, the performing of the battery SOC control may include setting the SOC balance level to be less than the set battery SOC to perform the battery SOC control when the set battery SOC is set to be equal to or greater than a predetermined reference SOC, and charging the battery to the set battery SOC when the vehicle approaches the destination. The performing of the battery SOC control may include setting an SOC balance level to be less than the set battery SOC to perform the battery SOC control when the set battery SOC is set to be equal to or greater than a predetermined reference SOC, controlling the battery SOC to swing based on the SOC balance level when the battery SOC reaches the SOC balance level, and charging the battery to the set battery SOC when the vehicle approaches the destination.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
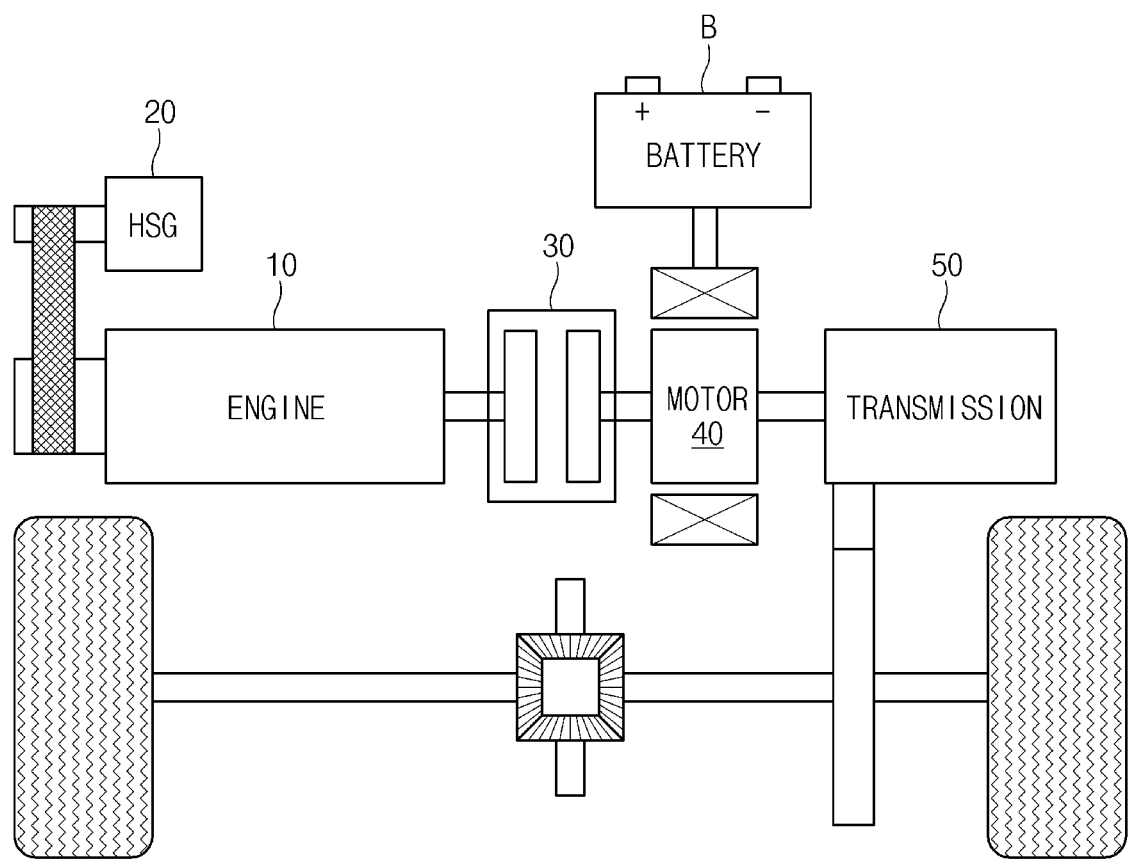
FIG. 1 is a block diagram illustrating a hybrid vehicle related to the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, some exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the exemplary embodiment of the present disclosure, a detailed description of the related known configuration or function will be omitted when it is determined that it interferes with the understanding of the embodiment of the present disclosure.

In describing the components of the exemplary embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a hybrid vehicle related to the present disclosure. A hybrid vehicle is a vehicle that uses two or more different driving sources, and generally refers to a vehicle driven by an engine that generates a driving force by burning fuel and a motor that generates the driving force with electric energy of a battery. For example, there are a hybrid electric vehicle (HEV) and a plug-in hybrid electric vehicle (PHEV). Referring to FIG. 1, the hybrid vehicle may include an engine 10, a hybrid starter generator (HSG) 20, a clutch 30, a motor 40, a transmission 50, and the like.

The engine 10 may be configured to generate power (an engine torque) required to drive the vehicle by burning the fuel. As the engine 10, various known engines such as a gasoline engine, a diesel engine, or the like may be used. The engine 10 may be configured to adjust an output torque (that is, an engine torque) in response to a command of an engine management system (EMS).

The HSG 20 may be mounted on the engine 10 to start the engine 10 by cranking the engine 10. The HSG 20 may play a key role of starting the engine when switching from an electric vehicle mode to a hybrid mode in which the engine 10 and the motor 40 operate together. The HSG 20 may be configured to generate the electric energy by operating as a generator in a state in which the engine 10 is started. The electric energy generated by the HSG 20 may be used to charge a battery "B". The clutch 30 may be disposed between the engine 10 and the motor 40 to regulate the power (the output torque) of the engine 10. The clutch 30 may be configured to transmit, to a driving wheel (a wheel), or block the power (the engine torque) generated by the engine 10 through engagement or disengagement.

The motor 40 may be configured to receive electric power from the battery "B" to generate the power (motor power) and transmit the power to the driving wheel. The motor 40 may be configured to adjust the output torque (a motor torque) of the motor 40 by changing a rotation direction and a revolution per minute (RPM) in response to instruction of a motor control unit (MCU). The motor 40 may be used as a generator for charging the battery "B" by generating a counter electro-motive force when a state of charge (SOC) of the battery is insufficient or during regenerative braking. The battery "B" serves to supply electric power required for driving the vehicle, which may be implemented as a high voltage battery. A power converter (not shown) may be disposed between the motor 40 and the battery "B". The power converter (not shown) may be configured to convert a voltage output from the battery "B" into a motor driving voltage and supply the motor driving voltage. The battery "B" may be charged by regenerative energy generated from the motor 40.

The transmission 50 may be configured to output the motor torque or a value obtained by convert the engine torque and the motor torque in a shift ratio matching a shift stage (a gear stage). The transmission 50 may be configured to change the shift stage in response to instruction of a transmission control unit (TCU). The TCU may be configured to determine the optimal shift stage based on information such as a travel speed of the vehicle (e.g., a vehicle speed or a wheel speed), a position of an acceleration pedal, an engine revolution per minute, and/or clutch travel through sensors mounted in the vehicle.

Figure 2:
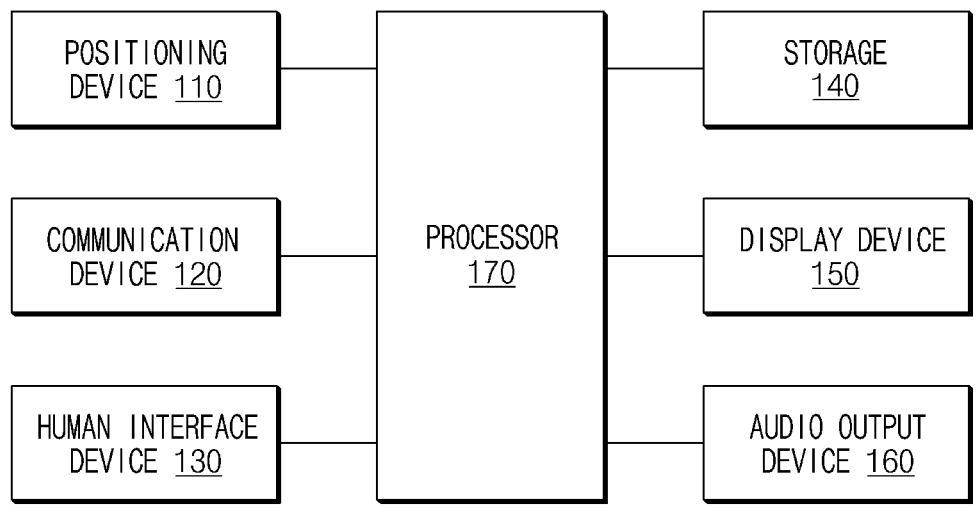
FIG. 2 illustrates a block diagram of a device for controlling an SOC of a battery according to an exemplary embodiment of the present disclosure.

FIG. 2 illustrates a block diagram of a device for controlling a SOC of a battery according to an exemplary embodiment of the present disclosure. Referring to FIG. 2, a battery SOC control device 100 may include a positioning device 110, a communication device 120, a human interface device (HID) 130, storage 140, a display device 150, an audio output device 160, and at least one processor 170.

The positioning device 110 may be configured to measure a current location of the battery SOC control device 100 (that is, a current location of the vehicle). The positioning device 110 may be implemented as a global positioning system (GPS) receiver. The GPS receiver may be configured to calculate the current location of the vehicle using signals transmitted from three or more GPS satellites. The GPS receiver may be configured to calculate a distance between the GPS satellite and the GPS receiver using a time difference between a time when the signal is transmitted from the GPS satellite and a time when the signal is received by the GPS receiver. The GPS receiver may be configured to calculate the current location of the vehicle using the calculated distance between the GPS satellite and the GPS receiver and location information of the GPS satellite contained in the transmitted signal. In this connection, the GPS receiver may be configured to calculate the current location using a triangulation method.

The communication device 120 may support performing communication between the battery SOC control device 100 and an external electronic device (e.g., a server) and/or an internal electric control unit (ECU). The communication device 120 may include a communication processor, a communication circuit, an antenna, and/or a transceiver. The communication device 120 may enable communication with the electric control unit inside the vehicle via a vehicle network such as a controller area network (CAN), a media oriented systems transport (MOST) network, a local interconnect network (LN), an ethernet, and/or a X-by-Wire (Flexray). The communication device 120 may enable communication with the external electronic device via a wireless communication network such as a wireless LAN (WLAN) (Wi-Fi) and the like, a short-range wireless communication network such as a Bluetooth and/or a near field communication (NFC), and a mobile communication network such as a long term evolution (LTE) and/or an international mobile telecommunication (IMT)-2020.

The human interface device 130 may be configured to generate data based on manipulation of a user. The human interface device 130 may be installed on a steering wheel, a dashboard, a center fascia, and/or a door trim. The human interface device 130 may be implemented as a keypad, a button, a switch, a joystick, a touch pad, and/or a touch screen. The storage 140 may be configured to store map data. The storage 140 may be configured to store a battery SOC setting history when terminating operation, and may be configured to store a charging profile and/or setting information. The storage 140 may be implemented as at least one of storage media (recording media) of a flash memory, a hard disk, a solid state disk (SSD), and/or web storage.

The display device 150 may be configured to output visual information in response to instruction of the processor 170. The display device 150 may be an audio video navigation (AVN) terminal, an in-vehicle infotainment (WI) terminal, and the like, and may include at least one of display devices of a liquid crystal display (LCD), a thin film transistor-liquid crystal display (IFT-LCD), an organic light-emitting diode (OLED) display, a flexible display, a three-dimensional display (3D display), a transparent display, a head-up display (HUD), a touch screen, and/or the like. The audio output device 160 may be configured to output audio data stored in the storage 140. The audio output device 160 may include a receiver, a speaker, and/or a buzzer.

The processor 170 may be configured to execute overall operations of the battery SOC control device 100. The processor 170 may be implemented as at least one processing device of an application specific integrated circuit (ASIC), a digital signal processor (DSP), a programmable logic device (PLD), a field programmable gate array (FPGA), a central processing unit (CPU), a microcontroller, and/or a microprocessor. In addition, the processor 170 may include a memory (not shown) located outside and/or inside the processor 170. The memory (not shown) may be a non-transitory storage medium that stores instructions executed by the processor 170. For example, the memory may be at least one of storage media of a read only memory (ROM), a programmable read only memory (PROM), an electrically erasable and programmable ROM (EEPROM), an erasable and programmable ROM (EPROM), a random access memory (RAM), and/or a static random access memory (SRAM).

To smoothly supply electric energy required by the user while the vehicle arrives at a travel destination (hereinafter, referred to as a destination) and stops, the processor 170 may be configured to enable the battery "B" to be efficiently charged and used during travel before arriving at the destination. The processor 170 may be configured to set a battery SOC desired by the user at the time at which the operation is terminated (that is, at the time of arriving at the destination) after setting the destination. When the battery SOC at the time at which the operation is terminated is set, the processor 170 may be configured to operate the vehicle such that the battery SOC becomes the set battery SOC (that is, the user set SOC and a target battery SOC) after the operation is terminated by reducing a battery usage or through charging. When the battery SOC at the time at which the operation is terminated is not set, the processor 170 may be configured to perform control in a direction to maximize fuel economy of the vehicle by preferentially using electric energy stored in the battery "B". This is because when the battery "B" is charged more than necessary, more fuel may be consumed to charge the battery "B".

The processor 170 may be configured to set the destination based on input data received from the human interface device 130, and activate a battery SOC setting function capable of setting the desired target battery SOC at the time at which the operation is terminated. When the destination is set, the processor 170 may be configured to output a battery SOC setting screen on the display device 150. The processor 170 may be configured to set the target battery SOC at the time at which the operation is terminated in response to an input received from the human interface device 130 in the battery SOC setting screen. In addition, when a campsite or a remote area is set as the destination, the processor 170 may be configured to automatically recommend activation of the battery SOC setting function. For example, when the destination is set to the campsite, the processor 170 may be configured to output a pop up battery SOC setting menu to induce the user to set the battery SOC.

In addition, the processor 170 may be configured to automatically activate the battery SOC setting function when a place where the number of activation of the battery SOC setting function is equal to or greater than a predetermined reference number is set as the destination. When the battery SOC setting function is activated, the processor 170 may be configured to output a notification (e.g., a message and/or a notification sound) notifying the user the target battery SOC and a fact that a battery SOC control function for reaching the target battery SOC is activated. The processor 170 may be configured to automatically set the target battery SOC to a recently set target battery SOC when automatically activating the battery SOC setting function. Although the setting of the target battery SOC to the recently set battery SOC is described in the present embodiment as an example, the present disclosure may not be limited thereto, and may set an average value of past set battery SOCs as the target battery SOC. The target battery SOC may be set within a limited range in which a performance and safety of the battery "B" are not harmed. In other words, the settable SOC range in which the target battery SOC may be set may be determined in advance. The settable SOC range may be limited within a range in which the battery "B" is not over-discharged and over-charged.

When the target battery SOC is set within the settable SOC range, the processor 170 may be configured to determine whether the set target battery SOC is equal to or less than an SOC chargeable with a high efficiency. In other words, when a desired battery SOC level at the time at which the operation is terminated is set, the processor 170 may be configured to determine whether the corresponding battery SOC level does not exceed the SOC chargeable with the high efficiency. When the target battery SOC is equal to or less than the SOC chargeable with the high efficiency, the processor 170 may be configured to adjust the battery SOC such that the battery SOC at the time at which the operation is terminated reaches the target battery SOC.

When the target battery SOC exceeds the SOC chargeable with the high efficiency, the processor 170 may be configured to output a warning providing a notification that a system efficiency may be reduced by the charging to reach the target battery SOC. The processor 170 may be configured to determine whether to perform the charging after outputting the warning. The processor 170 may be configured to determine to perform the charging based on a user input received from the human interface device 130. In addition, the processor 170 may be configured to perform the battery SOC control in response to determining to perform the charging, and may be configured to perform the battery SOC control to maximize the fuel economy of the vehicle in response to determining not to perform the charging.

Figure 3:
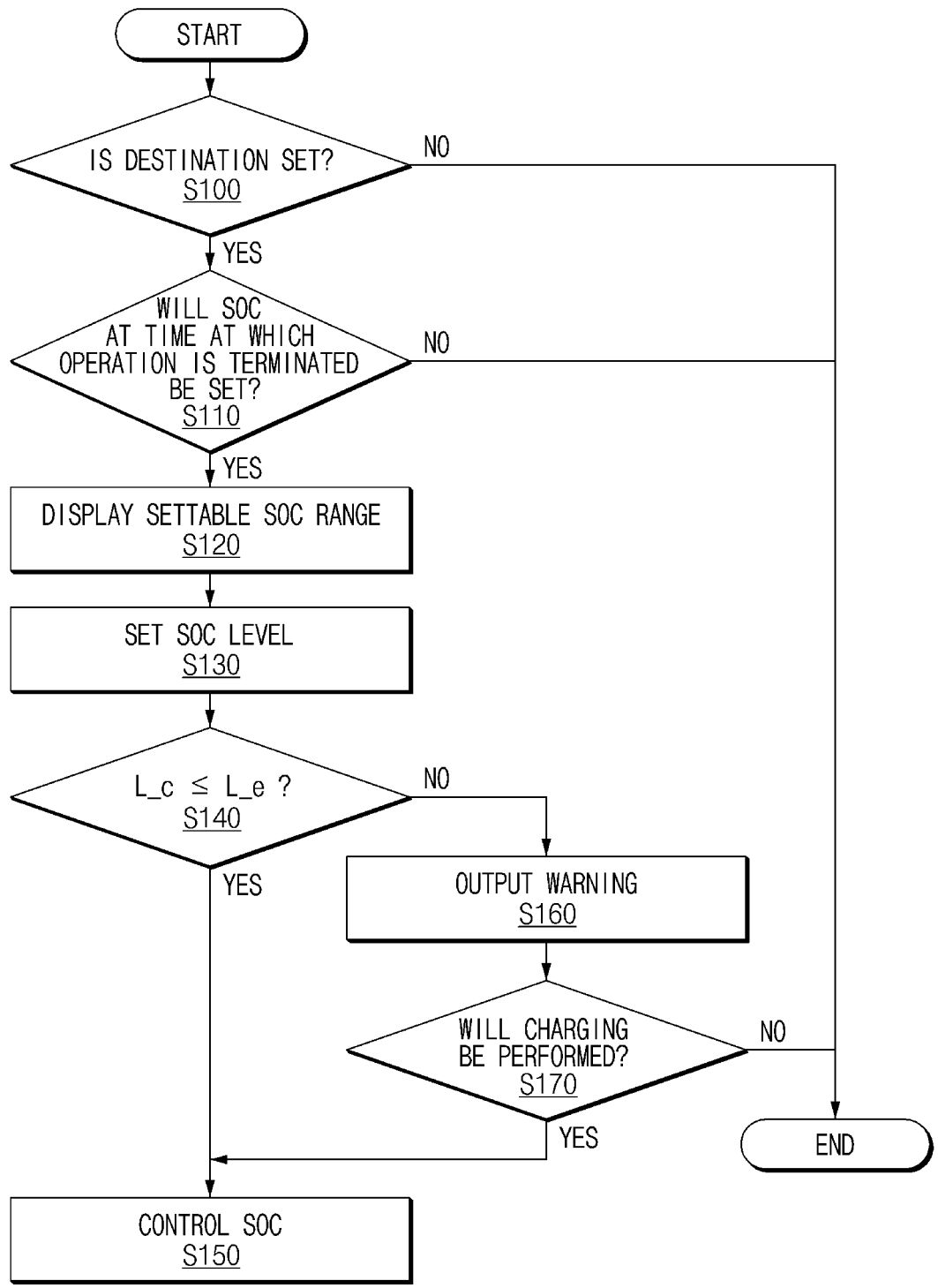
FIG. 3 is a flowchart illustrating a method for controlling an SOC of a battery of a hybrid vehicle according to an exemplary embodiment of the present disclosure.

FIG. 3 is a flowchart illustrating a method for controlling a SOC of a battery of a hybrid vehicle according to an exemplary embodiment of the present disclosure. First, the processor 170 may be configured to determine whether the destination is set (S100). The processor 170 may be configured to set the destination based on the user input that is input from the human interface device 130. The processor 170 may be configured to determine whether to set the battery SOC at the time at which the operation is terminated (that is, the target battery SOC) after setting the destination (S110).

In response to determining to set the battery SOC at the time at which the operation is terminated, the processor 170 may be configured to display the settable SOC range (S120). The processor 170 may be configured to output the battery SOC setting screen on the display device 150. In this connection, the processor 170 may be configured to display the settable SOC range on the battery SOC setting screen. The processor 170 may be configured to set a battery SOC level $L\_c$ at the time at which the operation is terminated within the settable SOC range (S130). The processor 170 may be configured to determine whether the set battery SOC level $L\_c$ is equal to or less than an SOC $L\_e$ chargeable with a high efficiency (S140).

When the set battery SOC level $L\_c$ is determined to be equal to or less than the SOC $L\_e$ chargeable with the high efficiency, the processor 170 may be configured to adjust the battery SOC to reach the set battery SOC level (the target battery SOC) $L\_c$ at the time at which the operation is terminated. (S150). When the set battery SOC level $L\_c$ is determined to exceed the SOC $L\_e$ chargeable with the high efficiency in S140, the processor 170 may be configured to output a warning providing a notification that the system efficiency may be reduced by the charging for the battery SOC to reach the set battery SOC level $L\_c$ at the time at which the operation is terminated (S160).

The processor 170 may be configured to determine whether to perform the charging after outputting the warning (S170). The processor 170 may be configured to determine whether to perform the charging based on the user input. The processor 170 may be configured to perform S150 in response to determining to perform the charging. In addition, the processor 170 may be configured to deactivate the function of setting the battery at the time at which the operation is terminated in response to determining not to perform the charging. In other words, the processor 170 may be configured to perform the battery SOC control for maximizing the vehicle fuel economy in response to determining not to perform the charging.

Hereinafter, a method for setting the battery SOC at the time at which the operation is terminated will be described in detail with reference to the drawings.

Figure 4:
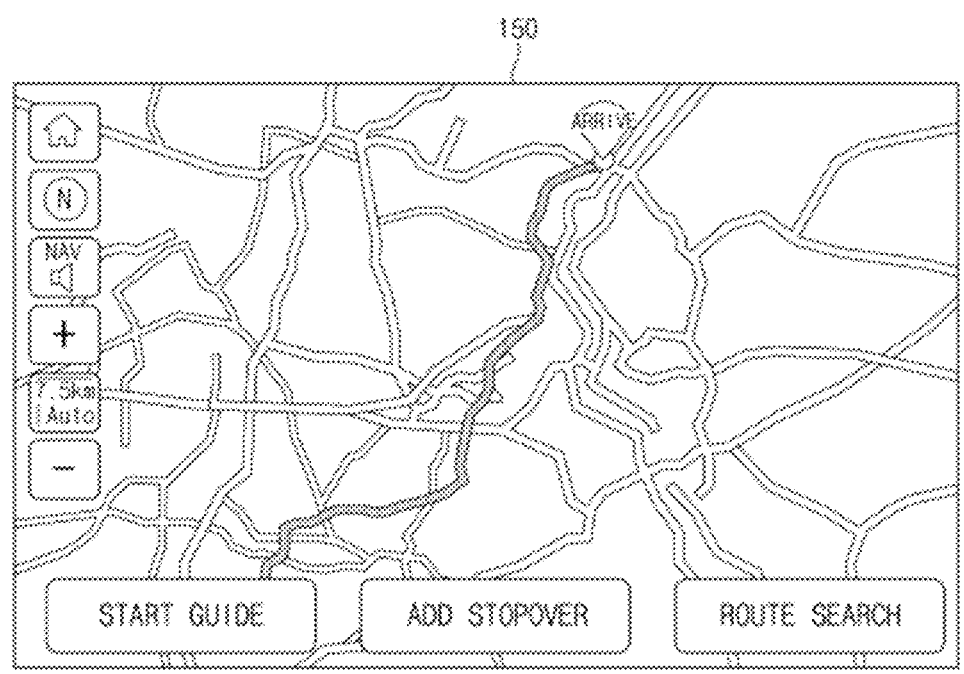
FIG. 4 is a diagram illustrating a route setting screen according to exemplary embodiments of the present disclosure.
Figure 5:
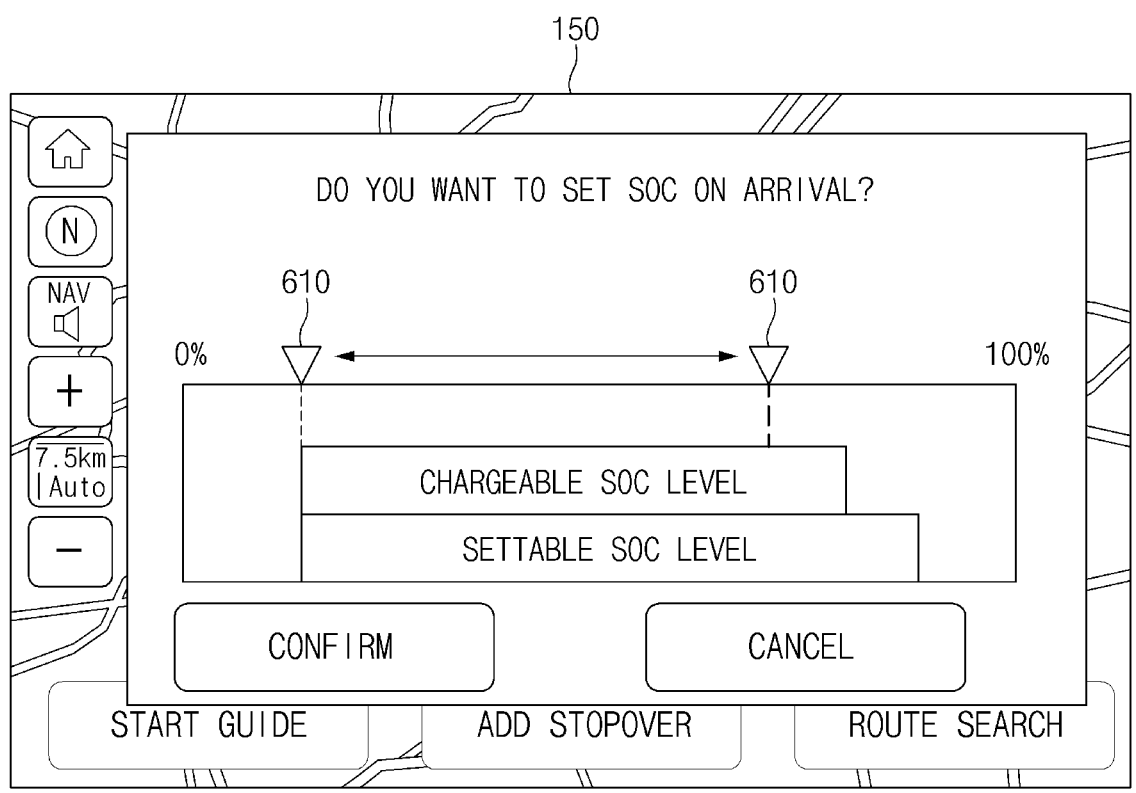
FIG. 5 is a diagram illustrating a battery SOC setting screen according to exemplary embodiments of the present disclosure.

FIG. 4 is a diagram illustrating a route setting screen according to exemplary embodiments of the present disclosure, and FIG. 5 is a diagram illustrating a battery SOC setting screen according to exemplary embodiments of the present disclosure. When the destination is set, the processor 170 may be configured to search and set a travel route from the current location of the vehicle to the destination. When the travel route is set, the processor 170 may be configured to output the set travel route on the display device 150 as shown in FIG. 4.

The processor 170 may be configured to activate the battery SOC setting function in response to the user input after setting the destination. When the battery SOC setting function is activated, the processor 170 may be configured to display the battery SOC setting screen in a pop-up form on the display device 150 as shown in FIG. 5. The processor 170 may be configured to display, on the SOC setting screen, the settable SOC range and an SOC range chargeable when traveling to the destination to be referred by the user when setting the battery SOC at the time at which the operation is terminated (that is, the target battery SOC). The processor 170 may be configured to horizontally move an indicator 610 displayed on the SOC setting screen in response to a user input, and set the target battery SOC based on a location of the finally moved indicator 610.

In addition, the processor 170 may be configured to automatically activate the battery SOC setting function when the set destination is the campsite or the remote area. For example, when the destination is set to the campsite, the processor 170 may be configured to output the battery SOC setting screen on the display device 150 to induce the user to set the battery SOC. In addition, the processor 170 may be configured to automatically activate the battery SOC setting function when the place where the number of activation of the battery SOC setting function is equal to or greater than the predetermined reference number is set as the destination. The processor 170 may be configured to automatically set the target battery SOC by referring to the battery SOC setting history when automatically activating the battery SOC setting function. After the activation of the battery SOC setting function, the processor 170 may be configured to output, on the display device 150 and/or the audio output device 160, the notification that provides a notification to the user that the battery SOC control function for allowing the battery SOC to reach the target battery SOC is activated at the time at which the operation is terminated.

Figure 6:
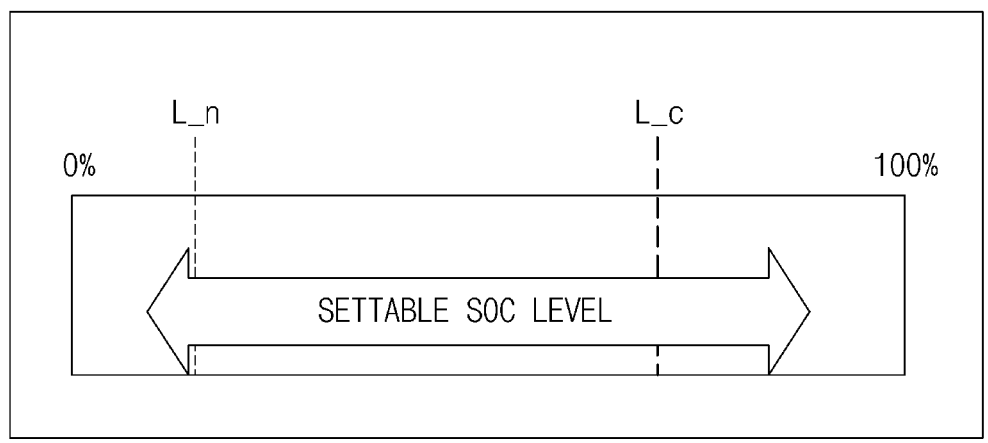
FIG. 6 is an exemplary view illustrating a settable SOC range according to exemplary embodiments of the present disclosure.
Figure 7:
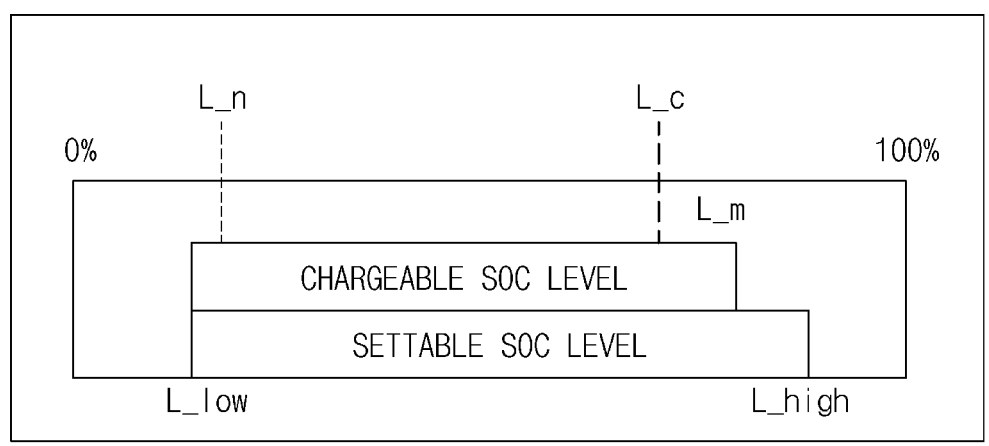
FIG. 7 is an exemplary view illustrating a chargeable SOC range according to exemplary embodiments of the present disclosure.

FIG. 6 is an exemplary view illustrating a settable SOC range according to exemplary embodiments of the present disclosure, and FIG. 7 is an exemplary view illustrating a chargeable SOC range according to exemplary embodiments of the present disclosure.

The target battery SOC may limit the settable SOC range to be set within the range in which the performance and the safety of the battery "B" are not harmed. The settable SOC range may be limited within a range in which the battery "B" is not over-discharged and over-charged. The settable SOC range may be visually displayed on a display screen as shown in FIG. 6. The user may set the target battery SOC $L\_c$ by referring to the displayed settable SOC range. Referring to FIG. 7, the target battery SOC $L\_c$ may be set within a range equal to or greater than a settable minimum SOC $L\_low$ and equal to or less than a settable maximum SOC $L\_high$. In addition, a chargeable maximum SOC $L\_m$ at the time of arriving at the destination may also be set within the range equal to or above the settable minimum SOC $L\_low$ and equal to or less the settable maximum SOC $L\_high$. The settable minimum SOC $L\_low$ and settable maximum SOC $L\_high$ may be set in advance based on a lifespan of the battery and travel safety of the vehicle.

When the user does not arbitrarily set the target battery SOC, the processor 170 may be configured to calculate a battery SOC $L\_n$ expected at the time of arriving at the destination and display the battery SOC $L\_n$ on the display screen. In this connection, the processor 170 may be configured to calculate the expected battery SOC $L\_n$ based on a travel distance of the vehicle.

Figure 8:
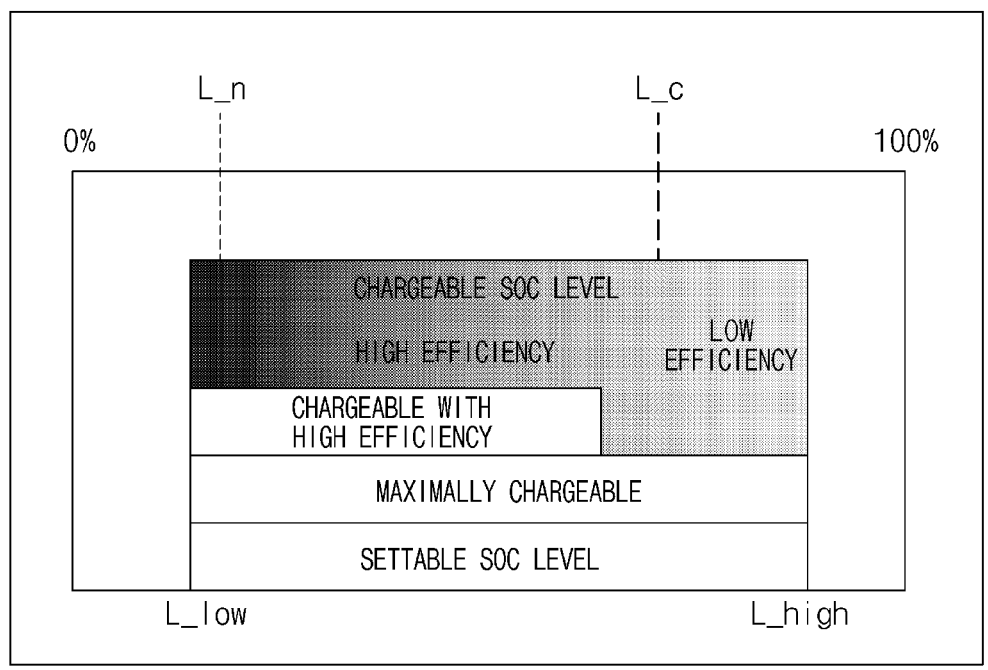
FIG. 8 is an exemplary view illustrating a screen for displaying a chargeable SOC range reflecting a charging efficiency according to exemplary embodiments of the present disclosure.

FIG. 8 is an exemplary view illustrating a screen for displaying a chargeable SOC range reflecting a charging efficiency according to exemplary embodiments of the present disclosure. Referring to FIG. 8, when displaying the SOC range chargeable during the travel to the destination, the range $L\_e$ chargeable by efficiently operating the engine 10 and the SOC range $L\_m$ chargeable by ignoring an engine efficiency and increasing an output of the engine 10 may be distinguished and displayed. In this connection, it may be possible to induce the user not to set the target battery SOC higher than necessary by displaying different colors and/or brightness based on a charging efficiency.

The SOC $L\_e$ chargeable with the high efficiency may represent a battery SOC expected when the engine 10 is operated in an optimal operating line (OOL) to the destination. In the case of operating the engine 10 in the OOL, since remaining energy obtained by subtracting energy consumed during the travel from energy produced during the travel may be used for the battery charging, the battery SOC at the time of arriving at the destination may be estimated using the corresponding remaining energy. When the travel distance to the destination is equal to or greater than a predetermined reference distance, the processor 170 may be configured to set the SOC $L\_e$ chargeable with the high efficiency to the settable maximum SOC $L\_high$. When the vehicle is able to travel equal to or greater than a predetermined distance (time), since the battery SOC is able to be charged up to the settable maximum SOC $L\_high$, the SOC $L\_e$ chargeable with the high efficiency may be set to the settable maximum SOC $L\_high$.

In addition, when the distance to the destination and altitude information may be identified, and when an altitude of the destination is less than an altitude of the current location of the vehicle and the travel distance to the destination is equal to or greater than the predetermined reference distance, the processor 170 may be configured to set the SOC $L\_e$ chargeable with the high efficiency to the settable maximum SOC $L\_high$. The reference distance may be varied based on the information on the altitudes of the destination and the current location of the vehicle.

Figure 9:
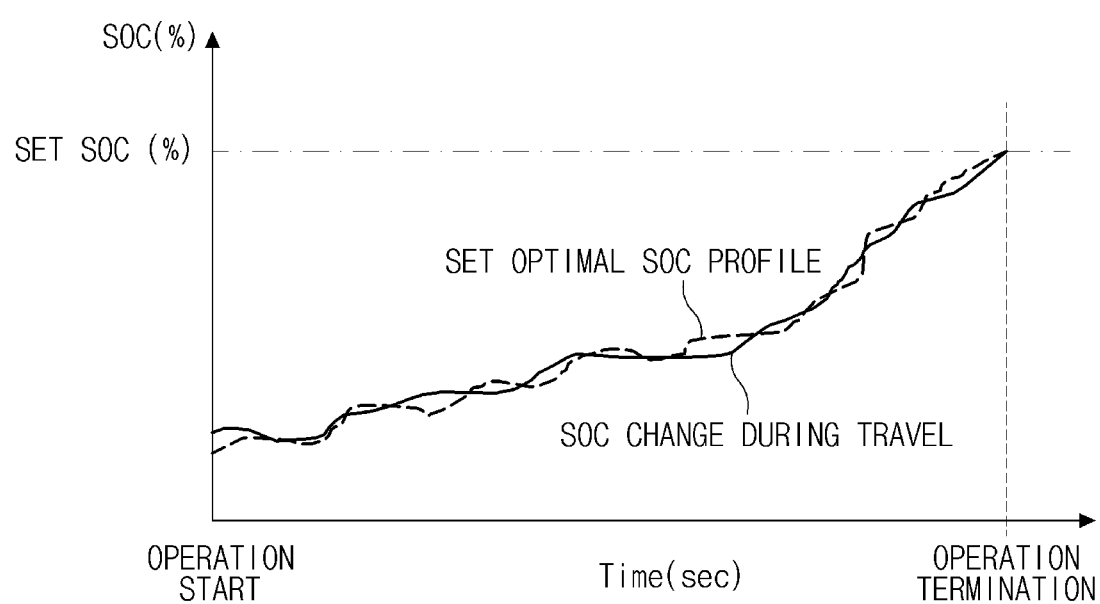
FIG. 9 is a graph illustrating a charging profile according to exemplary embodiments of the present disclosure.

Hereinafter, a method for performing battery SOC control during travel for allowing the battery SOC to reach the set battery SOC at the time of arriving at the destination will be described in detail. First, a method for performing battery SOC control by adjusting battery charging based on a charging profile during travel will be described with reference to FIG. 9. FIG. 9 is a graph illustrating a charging profile according to exemplary embodiments of the present disclosure.

When the battery SOC set by the user (that is, the target battery SOC) exceeds an SOC balance level set by default (that is, when the target battery SOC and the SOC balance level are different from each other), the charging profile may be set by utilizing travel route information, and the battery "B" may be charged by adjusting an engine operating point based on the set charging profile. In this connection, a change in the battery SOC occurs based on a charging/discharging amount of the battery while the hybrid vehicle travels, and thus, the SOC balance level refers to a center value of a range of the change in the battery SOC.

The processor 170 may be configured to calculate a travel load based on altitude information and/or average travel speed information of the travel route. The processor 170 may be configured to generate an efficient charging profile (an optimal SOC profile) for charging the battery "B" to the target battery SOC based on the calculated travel load. In addition, the processor 170 may be configured to set the generated charging profile as the SOC balance level, and adjust the operating point of the engine 10 to follow the set SOC balance level. Accordingly, since the engine operating point is adjusted by recognizing the charging profile set based on the travel load as the SOC balance level, it may be possible to operate the vehicle such that the vehicle may be operated as efficiently as possible while performing swing control on the battery SOC to be close to the corresponding charging profile rather than accurately following the charging profile.

Figure 10:
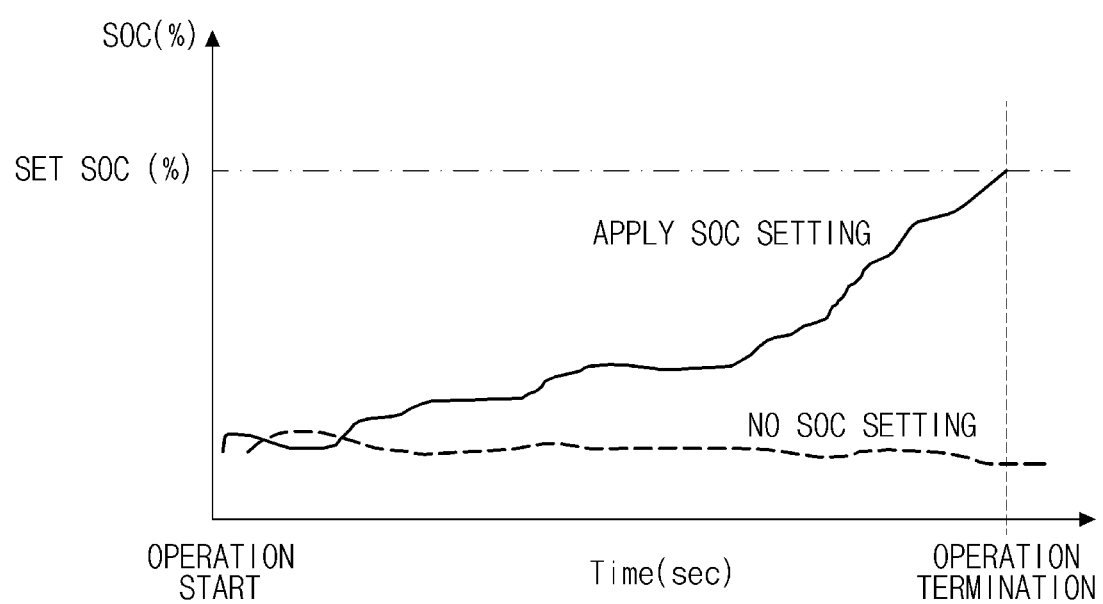
FIG. 10 is a graph illustrating a change in a battery SOC according to a first exemplary embodiment of the present disclosure.
Figure 11:
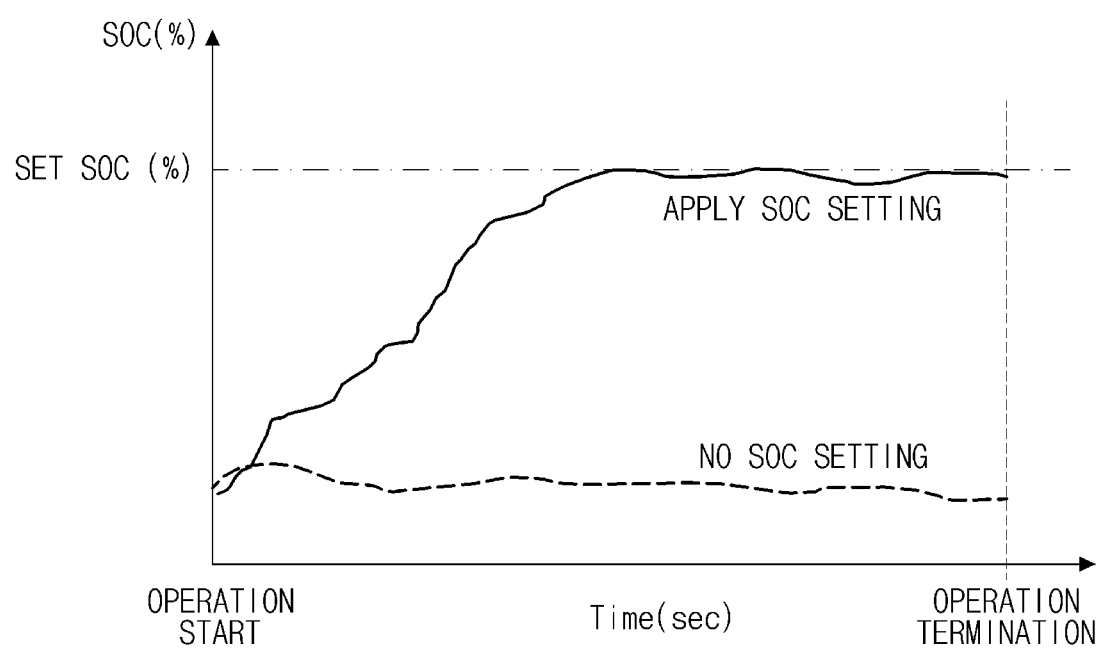
FIG. 11 is a graph illustrating a change in a battery SOC according to a second exemplary embodiment of the present disclosure.
Figure 12:
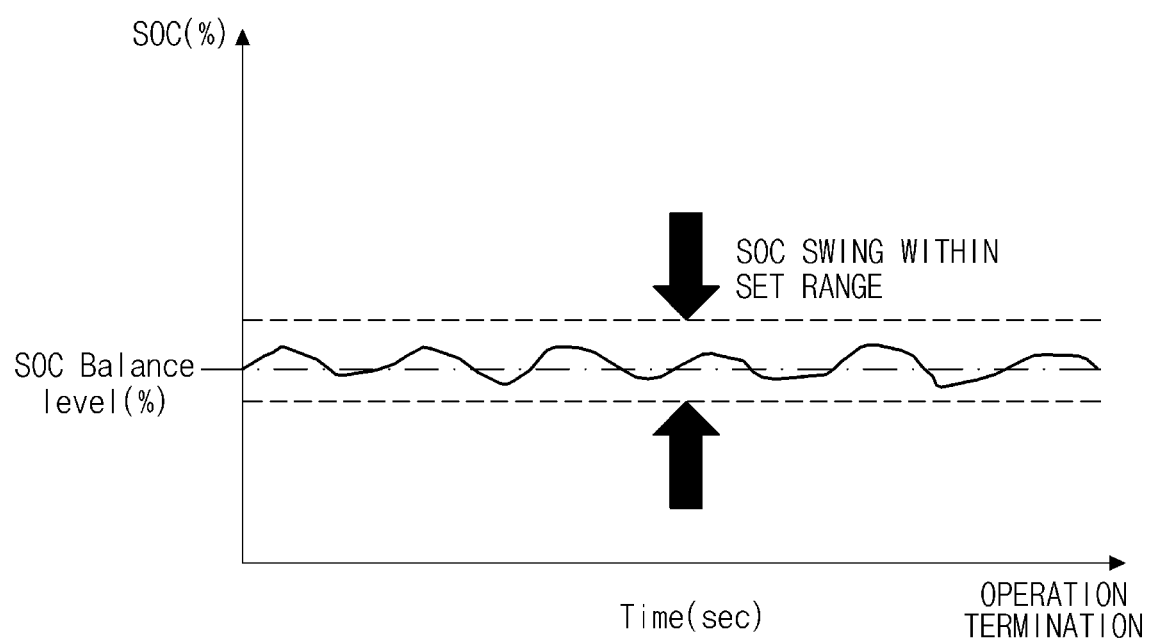
FIG. 12 is a graph illustrating a change in a battery SOC based on SOC balance level-based battery SOC control according to exemplary embodiments of the present disclosure.
Figure 13:
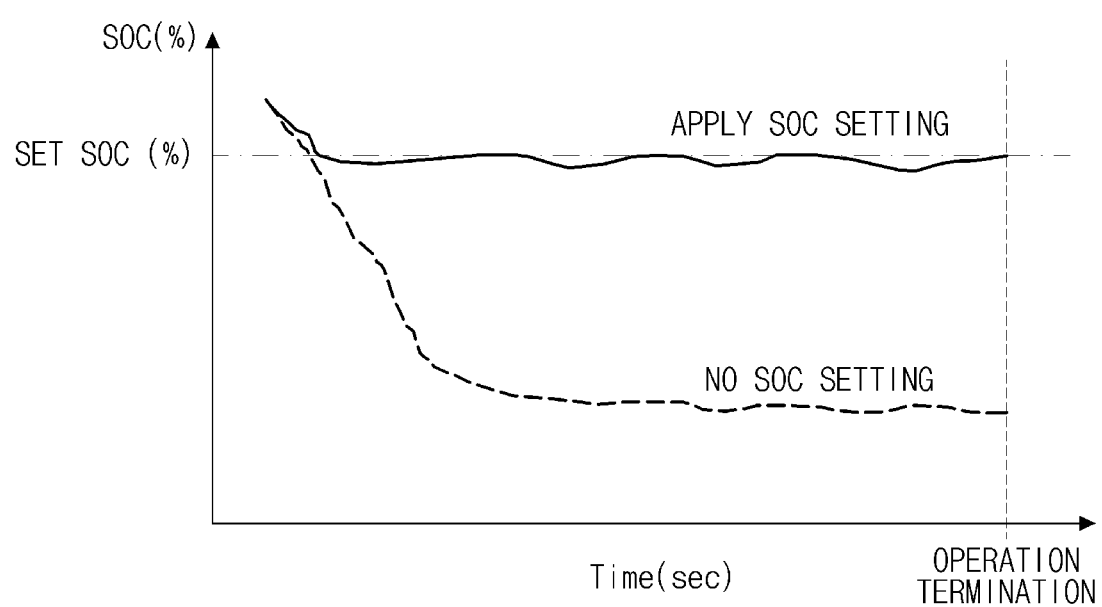
FIG. 13 is a graph illustrating a change in a battery SOC according to a third exemplary embodiment of the present disclosure.
Figure 14:
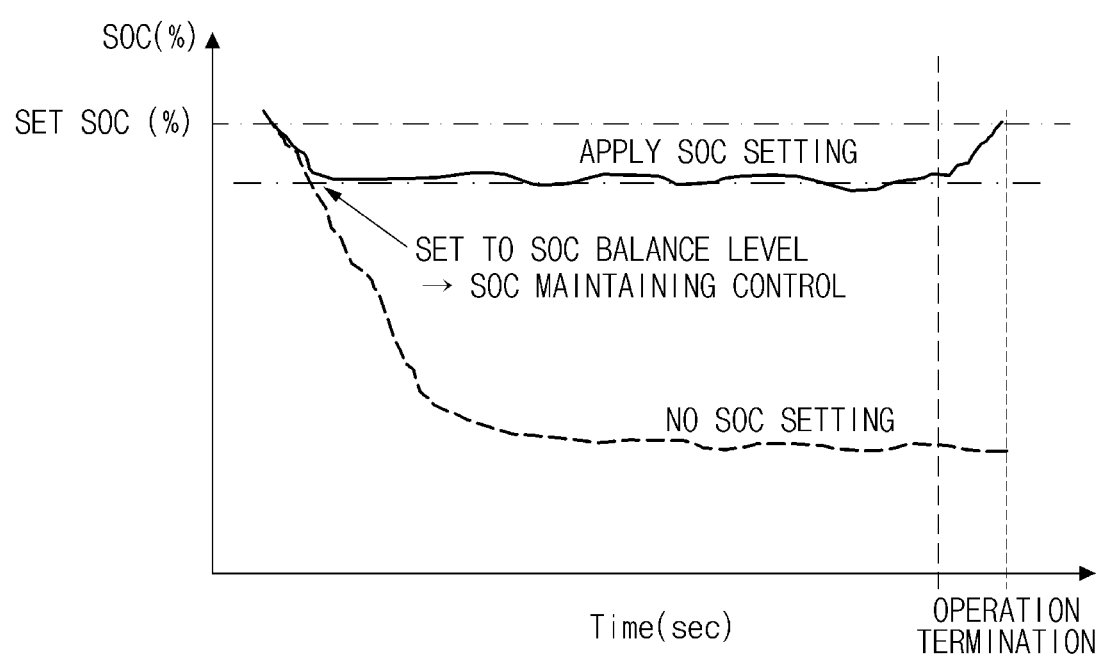
FIG. 14 is a graph illustrating a change in a battery SOC according to a fourth exemplary embodiment of the present disclosure.
Figure 15:
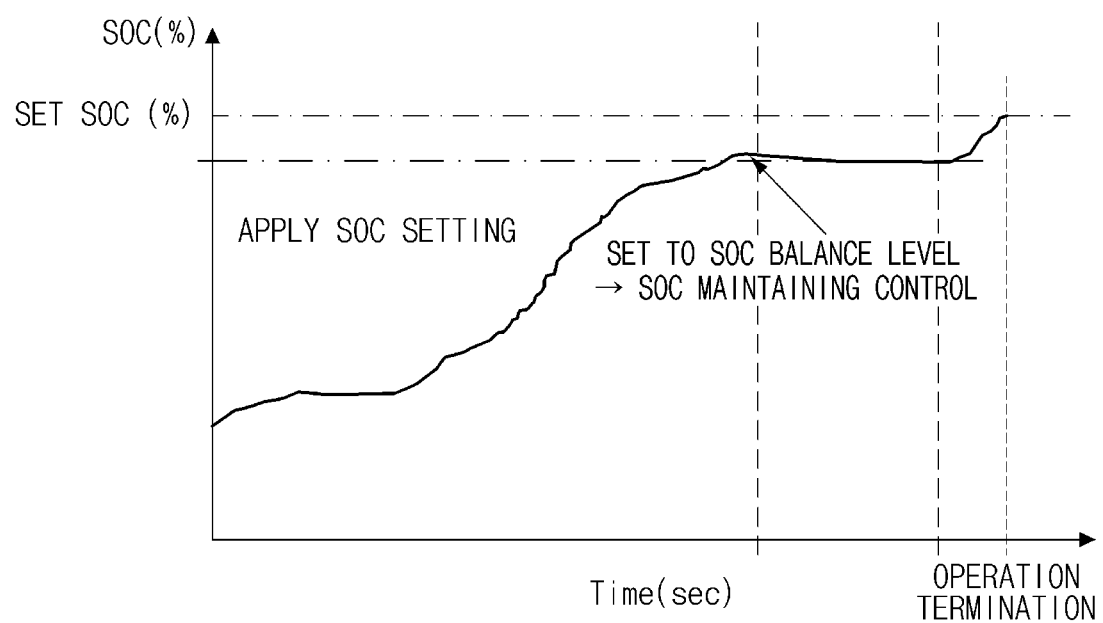
FIG. 15 is a graph illustrating a change in a battery SOC according to a fifth exemplary embodiment of the present disclosure.
Figure 16:
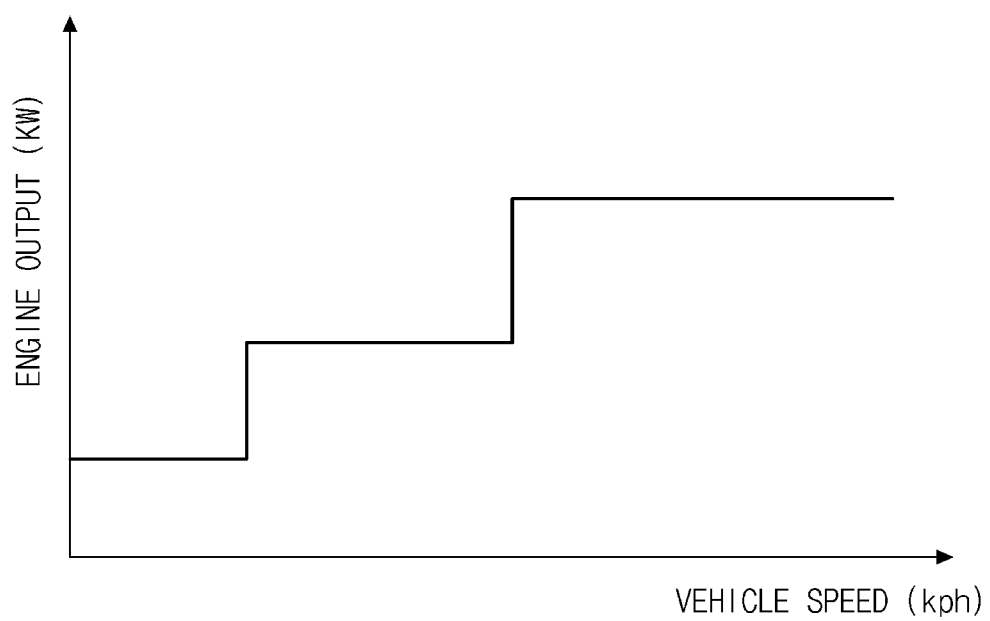
FIG. 16 is a graph illustrating an example of an engine output according to exemplary embodiments of the present disclosure.

Next, a method for performing battery SOC control through engine operating point control will be described in detail with reference to FIGS. 10 to 17. FIG. 10 is a graph illustrating a change in a battery SOC according to a first exemplary embodiment of the present disclosure, FIG. 11 is a graph illustrating a change in a battery SOC according to a second exemplary embodiment of the present disclosure, and FIG. 12 is a graph illustrating a change in a battery SOC based on SOC balance level-based battery SOC control according to exemplary embodiments of the present disclosure. FIG. 13 is a graph illustrating a change in a battery SOC according to a third exemplary embodiment of the present disclosure. FIG. 14 is a graph illustrating a change in a battery SOC according to a fourth exemplary embodiment of the present disclosure. FIG. 15 is a graph illustrating a change in a battery SOC according to a fifth exemplary embodiment of the present disclosure. FIG. 16 is a graph illustrating an example of an engine output according to exemplary embodiments of the present disclosure, and FIG.

17 is a graph illustrating another example of an engine output according to exemplary embodiments of the present disclosure.

The processor 170 may be configured to charge the battery while maintaining a hybrid electric vehicle (HEV) mode without switching a travel mode to an electric vehicle (EV) mode when the travel load is low during the travel. In this connection, the processor 170 may be configured to operate the engine 10 in the optimal operating line (OOL), and may be configured to charge the battery "B" using the remaining energy excluding a torque (power) required during the travel.

When a current battery SOC is less than the set SOC (the target battery SOC) during the battery charging, and when the travel load is less than a predetermined reference, the processor 170 may be configured to prohibit the switching of the travel mode to the EV mode and allow the engine 10 to operate at an efficient operating point to charge the battery "B" with the remaining energy excluding the energy required for the travel. Accordingly, as shown in FIG. 10, when the battery SOC at the time at which the operation is terminated is not set, the battery SOC may be adjusted to converge to a predetermined specific SOC. On the other hand, when the battery SOC at the time at which the operation is terminated is set, the battery SOC increases as an operation time (the travel distance) of the vehicle increases, and thus, the battery SOC may be adjusted to increase to reach the set SOC at the time at which the operation is terminated.

When the battery SOC reaches the set SOC before the arrival of the destination due to a long travel distance of the vehicle, the vehicle may travel by setting the set SOC to the SOC balance level. For example, as shown in FIG. 11, when the battery SOC reaches the set SOC (that is, the target battery SOC) before the vehicle terminates the operation, that is, before the vehicle arrives at the destination, the battery SOC may be adjusted by setting the set SOC to the SOC balance level. In this connection, the processor 170 may be configured to adjusted the battery SOC to swing within a preset range (e.g., ±10%) based on the SOC balance level as shown in FIG. 12.

Referring to FIG. 13, when the current battery SOC is greater than the battery SOC set by the user (the set SOC), the processor 170 may be configured to set the set battery SOC to the SOC balance level, and adjust the battery SOC such that the battery SOC converges to the set SOC balance level.

Referring to FIG. 14, when the battery SOC set by the user (the set SOC) is set to be equal to or greater than a predetermined reference SOC, the processor 170 may be configured to perform control by setting the SOC balance level to be less than the set battery SOC. In this connection, the processor 170 may be configured to set the SOC balance level lowered at a predetermined certain ratio compared to the set battery SOC. The processor 170 may be configured to charge the battery "B" such that the battery SOC reaches the set battery SOC at a time close to the time at which the operation is terminated.

The hybrid vehicle may be configured to perform the SOC swing control to allow the battery SOC to accumulate regenerative braking energy during the operation to recover the energy during the regenerative braking. Therefore, when the user set SOC is set too high above the predetermined reference SOC, the processor 170 may be configured to discharge the battery to a level lower than the set SOC during the travel to the destination to maximize a driving efficiency of the vehicle during the travel. In addition, the processor 170 may be configured to perform the charging control such that the battery SOC reaches the set SOC immediately before arriving at the destination. For example, when the set battery SOC is about 90%, the processor 170 may be configured to set the SOC balance level to about 80% to adjust the battery SOC to maintain about 80%, and charge the battery "B" from about 5 km before arriving at the destination to the arrival of the destination to allow the battery SOC to reach the set battery SOC.

Referring to FIG. 15, when the set SOC is set too high above the predetermined reference SOC, the processor 170 may be configured to determine whether the travel distance to the destination is sufficient to charge the battery "B" such that the battery SOC reaches the set SOC. In response to determining that the travel distance to the destination is sufficient, the processor 170 may be configured to charge the battery "B" to the set SOC when approaching the destination after adjusting the battery SOC by setting the SOC balance level to be less than the set SOC at the predetermined ratio.

When the battery SOC $L\_c$ set by the user (the set SOC) is set greater than the SOC $L\_e$ chargeable with the high efficiency ($L\_e<L\_c$), the processor 170 may be configured to determine whether the current battery SOC is less than the set SOC during the charging. When the current battery SOC is less than the set SOC, the processor 170 may be configured to prohibit the switching of the travel mode to the EV mode when the travel load is less than the predetermined reference, and charge the battery "B" using the remaining energy excluding the energy required for the travel by operating the engine 10 in the OOL. In other words, when the set SOC is equal to or greater than the SOC chargeable with the high efficiency, the engine operating point may be used at a point at which the engine output is better than at a point at which the engine efficiency is sufficient to charge the battery "B". Accordingly, the engine may be used by increasing a speed or a torque of the engine than that at the point of the sufficient efficiency.

In addition, the processor 170 may be configured to output, on the display device 150 and/or the audio output device 160, the warning (the notification) notifying that the set SOC is set greater than the SOC chargeable with the high efficiency. In this connection, the processor 170 may be configured to output the warning such that the user may recognize a fact that the battery will be charged to the set SOC desired by the user even though the engine efficiency is insufficient. In addition, the processor 170 may be configured to output a waning (a notification) that provides a notification that noise of the engine 10 may increase for the battery charging through the display device 150 and/or the audio output device 160.

The processor 170 may be configured to charge the battery "B" more rapidly to the set SOC by increasing the output of the engine 10 to be equal to or greater than an engine output of the point with the sufficient engine efficiency. In particular, the charging control may be performed only within a range in which stability of the system is not harmed. The range in which the stability of the system is not harmed may include a range of prevention of overheating of the engine, the motor, and the battery, prohibition of exceeding a charge/discharge limit value of the battery and the motor, and the like.

To increase the output of the engine 10, a gear stage may be shifted downward to allow the engine 10 to be driven at a higher revolution per minute (RPM) in a vehicle equipped with a stepped transmission, and the engine 10 may be driven by increasing the RPM or the torque of the engine 10 in a vehicle equipped with a continuously variable transmission. The battery "B" may be charged more rapidly by increasing the RPM of the engine 10 to allow the engine 10 to operate at the operating point at which the engine 10 may produce a higher output and using the remaining energy excluding the travel load of the vehicle.

Figure 17:
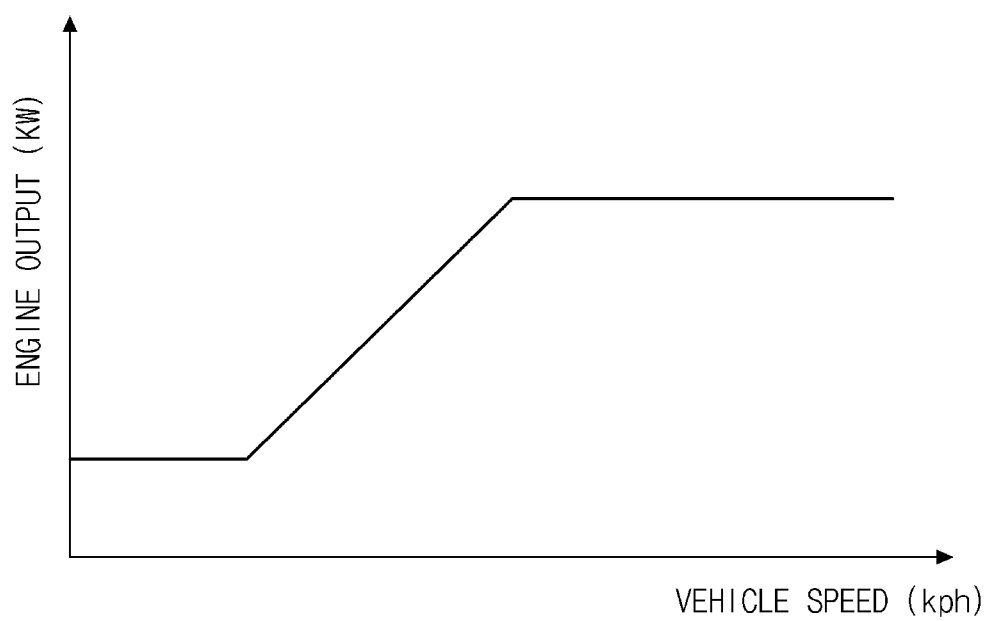
FIG. 17 is a graph illustrating another example of an engine output according to exemplary embodiments of the present disclosure.

A substantial amount of heat may be generated from the engine 10 and an exhaust pipe (not shown) when increasing the output of the engine 10 for the charging during the charging while traveling. Thus, the processor 170 may be configured to perform control such that the output of the engine 10 for the charging does not increase to be equal to or greater than a specific value at a low speed with weak travel wind, and increase the output of the engine for the charging at a vehicle speed equal to or greater than a certain vehicle speed with smoothly supplied travel wind. The engine output for the charging may be increased stepwise as shown in FIG. 16, and may be gradually increased as shown in FIG. 17. An output limit value of the engine 10 based on the vehicle speed may be set to prevent an abnormality in the system of the vehicle by the engine heat. In addition, to reduce discomfort of passengers in the vehicle, the output value may be limited based on both the vehicle speed and the noise to minimize discomfort to the passengers resulted from the noise of the engine 10.

Figure 18:
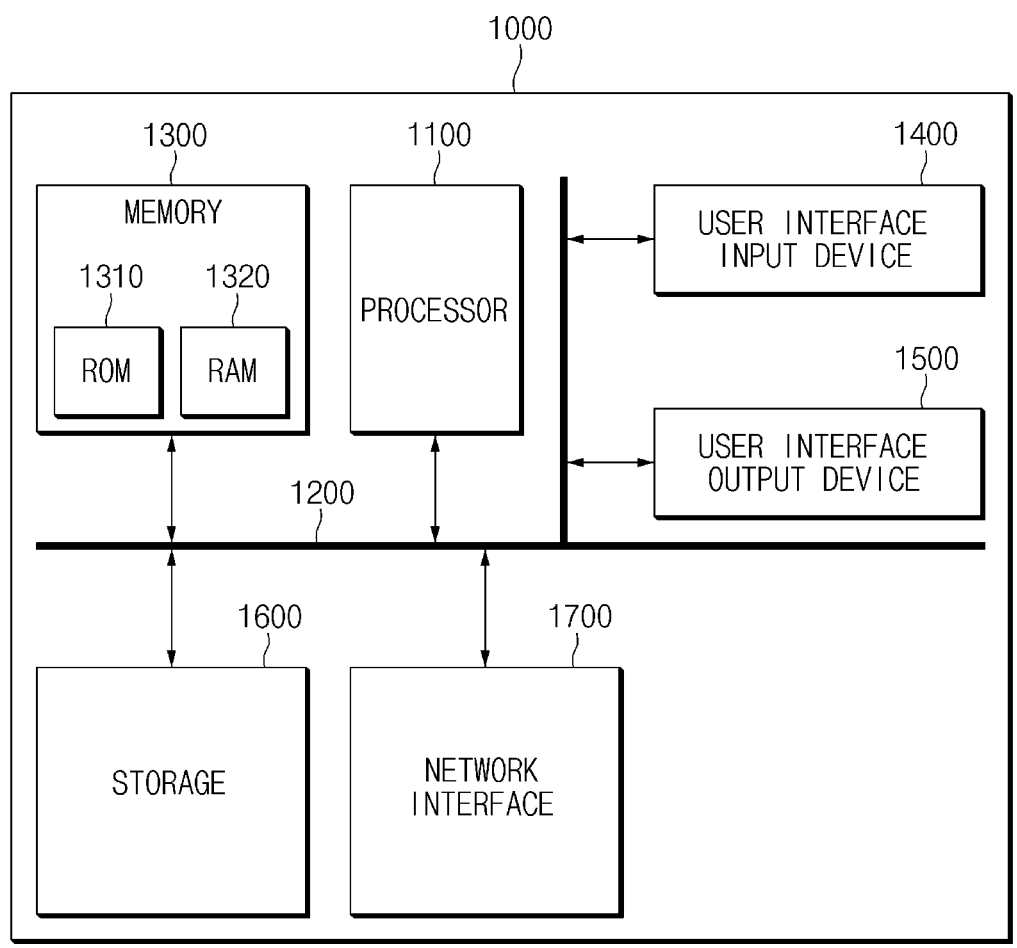
FIG. 18 is a block diagram illustrating a computing system executing a method for controlling an SOC of a battery according to exemplary embodiments of the present disclosure.

FIG. 18 is a block diagram illustrating a computing system executing a method for controlling an SOC of a battery according to exemplary embodiments of the present disclosure. Referring to FIG. 18, a computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor 1100 and the storage medium may reside as individual components in the user terminal.

The description above is merely illustrative of the technical idea of the present disclosure, and various modifications and changes may be made by those skilled in the art without departing from the essential characteristics of the present disclosure. Therefore, the exemplary embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

According to the present disclosure, the battery SOC at the time at which the vehicle operation is terminated may be set when setting the destination of the vehicle, and the battery charging may be adjusted during the travel such that the battery SOC reaches the set SOC when arriving at the destination. Therefore, when the electricity is required to be supplied while stopping at the destination, the required electric energy may be received from the battery of the vehicle without the engine operation, thereby providing convenience to the user.

In addition, according to the present disclosure, since the battery is charged using the operating point with the high engine efficiency during the travel, the battery may be efficiently charged. In addition, according to the present disclosure, the battery mounted on the vehicle may be used not only for the vehicle travel, but also as an energy source by the user while the vehicle is parked.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A device for controlling a state of charge (SOC) of a battery of a hybrid vehicle, the device comprising:
   at least one processor,
   wherein the at least one processor is configured to:
      set a battery SOC at a time of terminating operation of the vehicle by activating a SOC setting function when a destination is set;
      determine that the set battery SOC is equal to or less than an SOC chargeable with a high efficiency; and
      perform battery SOC control to adjust a battery SOC to reach the set battery SOC at a time of arrival at the destination of the vehicle in response to determining that the set battery SOC is equal to or less than the SOC chargeable with the high efficiency;
   wherein the at least one processor is further configured to:
      display a settable SOC range and an SOC range chargeable during travel to the destination on a display screen when the SOC setting function is activated; and
      determine that a current battery SOC is greater than the SOC balance level; and
      set the set battery SOC to a SOC balance level to adjust the battery SOC to converge to the set battery SOC in response to determining that the current battery SOC is greater than the SOC balance level.

2. The device of claim 1, wherein the at least one processor is configured to automatically set the battery SOC at the time of terminating the operation by referring to a SOC setting history stored in a storage when the SOC setting function is activated.

3. The device of claim 1, wherein the SOC chargeable with the high efficiency is a battery SOC expected when operating an engine to the destination in an optimal operating line (OOL).

4. The device of claim 1, wherein the SOC chargeable with the high efficiency is set to a settable maximum SOC when a travel distance to the destination is equal to or greater than a reference distance, wherein the reference distance is varied based on information on altitudes of the destination and a current location of the vehicle.

5. The device of claim 1, wherein the at least one processor is configured to:
set a charging profile by utilizing travel route information when the set battery SOC exceeds a SOC balance level; and
adjust an engine operating point based on the set charging profile to charge the battery.

6. The device of claim 1, wherein the at least one processor is configured to prohibit switching of a travel mode to an electric vehicle (EV) mode and operate an engine in an optimal operating line to charge the battery with remaining energy excluding energy required for travel in response to determining that a travel load is low and a current battery SOC is less than the set battery SOC.

7. The device of claim 1, wherein the at least one processor is configured to:
set the SOC balance level to be less than the set battery SOC to perform the battery SOC adjustment in response to determining that the set battery SOC is set to be equal to or greater than a predetermined reference SOC; and
charge the battery to the set battery SOC when the vehicle approaches the destination.

8. The device of claim 1, wherein the at least one processor is configured to:
set an SOC balance level to be less than the set battery SOC to perform the battery SOC adjustment in response to determining that the set battery SOC is set to be equal to or greater than a predetermined reference SOC;
adjust the battery SOC to swing based on the SOC balance level when the battery SOC reaches the SOC balance level; and
charge the battery to the set battery SOC when the vehicle approaches the destination.

9. A method for controlling a state of charge (SOC) of a battery of a hybrid vehicle, comprising:
setting, by a processor, a battery SOC at a time of terminating operation of the vehicle by activating a SOC setting function when a destination is set;
determining, by the processor, that the set battery SOC is equal to or less than a SOC chargeable with a high efficiency; and
performing, by the processor, battery SOC control to adjust a battery SOC to reach the set battery SOC at a time of arrival at the destination of the vehicle in response to determining that the set battery SOC is equal to or less than the SOC chargeable with the high efficiency;
wherein the setting of the battery SOC includes displaying an SOC range and an SOC range chargeable during travel to the destination on a display screen when the SOC setting function is activated,
wherein the performing of the battery SOC adjustment includes:
determining, by the processor, that a current battery SOC is greater than the SOC balance level; and
setting the set battery SOC to a SOC balance level to adjust the battery SOC to converge to the set battery SOC in response to determining that the current battery SOC is greater than the COC balance level.

10. The method of claim 9, wherein the setting of the battery SOC further includes:
automatically setting the battery SOC at the time of terminating the operation by referring to a SOC setting history stored in a storage when the SOC setting function is activated.

11. The method of claim 9, wherein the determining of whether the set battery SOC is equal to or less than the SOC chargeable with the high efficiency includes:
setting a battery SOC expected when operating an engine to the destination in an optimal operating line (OOL) as the SOC chargeable with the high efficiency.

12. The method of claim 9, wherein the determining of whether the set battery SOC is equal to or less than the SOC chargeable with the high efficiency further includes:
setting the SOC chargeable with the high efficiency to a settable maximum SOC in response to determining that a travel distance to the destination is equal to or greater than a reference distance,
wherein the reference distance is varied based on information on altitudes of the destination and a current location of the vehicle.

13. The method of claim 9, wherein the performing of the battery SOC adjustment includes:
setting a charging profile by utilizing travel route information in response to determining that the set battery SOC exceeds an SOC balance level; and
adjusting an engine operating point based on the set charging profile to charge the battery.

14. The method of claim 9, wherein the performing of the battery SOC adjustment includes:
prohibiting switching of a travel mode to an electric vehicle (EV) mode and operate an engine in an optimal operating line to charge the battery with remaining energy excluding energy required for travel in response to determining that a travel load is low and a current battery SOC is less than the set battery SOC.

15. The method of claim 9, wherein the performing of the battery SOC adjustment further includes:
setting the SOC balance level to be less than the set battery SOC to perform the battery SOC adjustment in response to determining that the set battery SOC is set to be equal to or greater than a predetermined reference SOC; and
charging the battery to the set battery SOC when the vehicle approaches the destination.

16. The method of claim 9, wherein the performing of the battery SOC adjustment includes:
setting a SOC balance level to be less than the set battery SOC to perform the battery SOC adjustment in response to determining that the set battery SOC is set to be equal to or greater than a predetermined reference SOC;
adjusting the battery SOC to swing based on the SOC balance level in response to determining that the battery SOC reaches the SOC balance level; and
charging the battery to the set battery SOC when the vehicle approaches the destination.

* * * * *